(12) United States Patent
Halff

(10) Patent No.: US 6,301,894 B1
(45) Date of Patent: Oct. 16, 2001

(54) GEOTHERMAL POWER GENERATOR

(76) Inventor: Albert H. Halff, 3514 Rock Creek Park, Dallas, TX (US) 75204

( * ) Notice: Subject to any disclaimer, the term of this patent is extended or adjusted under 35 U.S.C. 154(b) by 0 days.

(21) Appl. No.: 09/569,389

(22) Filed: May 12, 2000

(51) Int. Cl.$^7$ .................................................... F03G 7/00
(52) U.S. Cl. ........................................ 60/641.2; 60/641.1
(58) Field of Search ................................. 60/641.1, 641.2

(56) References Cited

U.S. PATENT DOCUMENTS

| | | |
|---|---|---|
| 3,274,769 | 9/1966 | Reynolds . |
| 3,470,943 | 10/1969 | Van Huisen . |
| 3,765,477 | * 10/1973 | Van Huisen ............................ 165/45 |
| 3,857,244 | 12/1974 | Faucette . |
| 3,864,208 | * 2/1975 | Van Huisen ............................ 176/39 |
| 4,052,857 | 10/1977 | Altschuler . |
| 4,137,720 | * 2/1979 | Rex ....................................... 60/641.1 |
| 4,220,202 | * 9/1980 | Aladiev et al. ......................... 166/57 |
| 4,223,729 | * 9/1980 | Foster ................................ 166/250 X |
| 4,290,266 | 9/1981 | Twite et al. . |
| 4,512,156 | 4/1985 | Nagase . |
| 4,712,380 | * 12/1987 | Smith .................................. 60/641.2 |
| 4,776,169 | 10/1988 | Coles, Jr. . |
| 5,661,977 | 9/1997 | Shnell . |
| 5,685,362 | * 11/1997 | Brown ................................... 165/45 |

OTHER PUBLICATIONS

Baker Hughes INTEQ—Short Radius May 1987.

* cited by examiner

*Primary Examiner*—Hoang Nguyen
(74) *Attorney, Agent, or Firm*—Joseph J. Previto

(57) ABSTRACT

A geothermal power generation system having an input well extending from the surface into a hot rock strata and an output well spaced away from the input well extending from the surface into the hot rock strata. The input and output wells extend into the hot rock strata. A horizontal bore connects the two wells together. The bore is located in the hot rock strata and consists of a casing alone or a casing and a backfill between the casing and the hole, in order to prevent the water and steam flowing through the bore from coming into contact with either the hot rock strata or the aggressive water in the hot rock strata. Alternatively, the system may consist of only one vertical well and a horizontal bore extending into the hot rock strata and a pipe that returns the water into the horizontal bore. The water flowing through the horizontal bore changes to steam due to the heat of the hot rock strata and is discharged to a turbine that turns an electrical generator which in turn feeds power into an existing grid or other useful electrically operated device. This invention avoids the problem of controlling and/or treating the aggressive water in the hot rock strata thereby substantially reducing the cost of producing power from a geothermal resource.

7 Claims, 2 Drawing Sheets

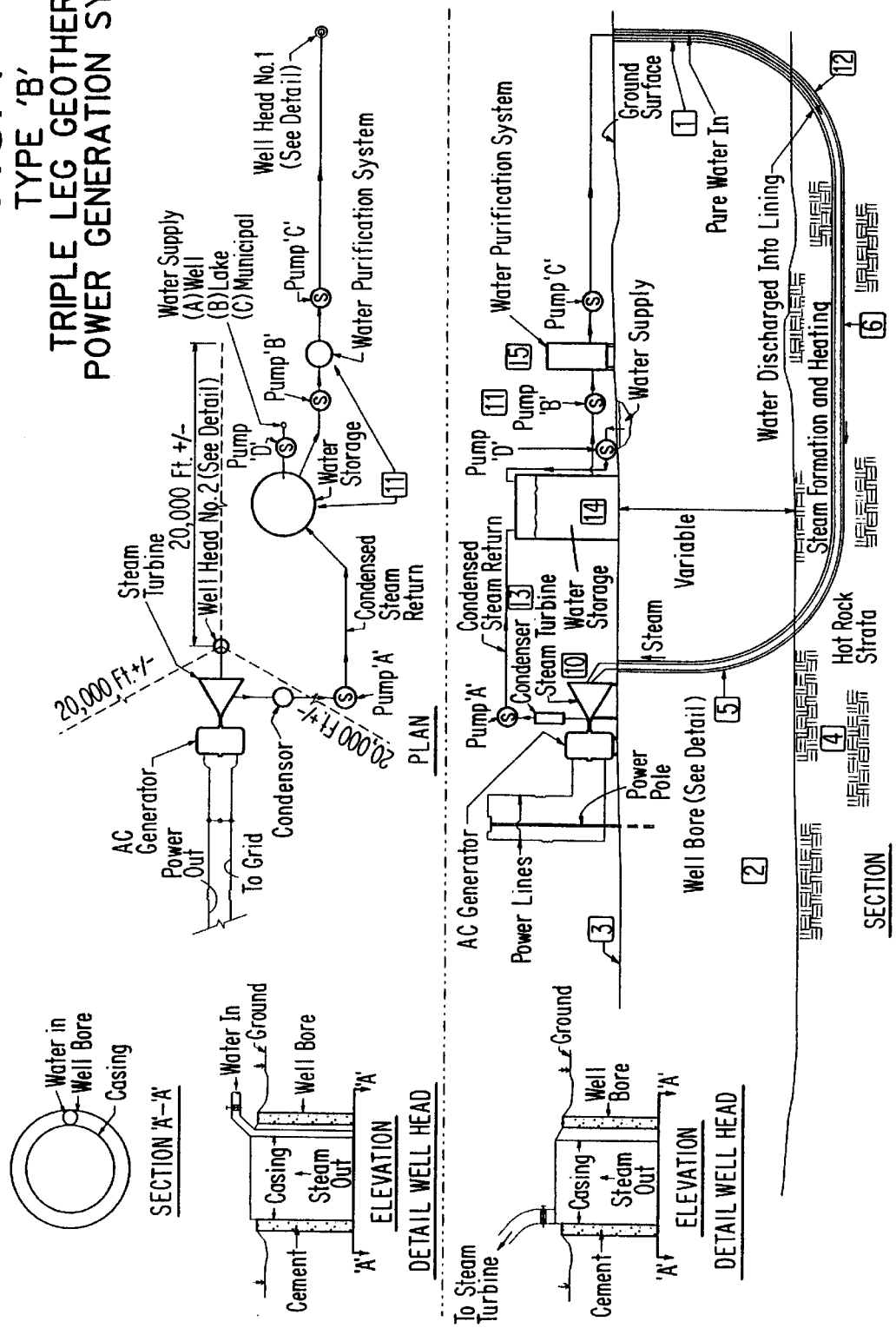

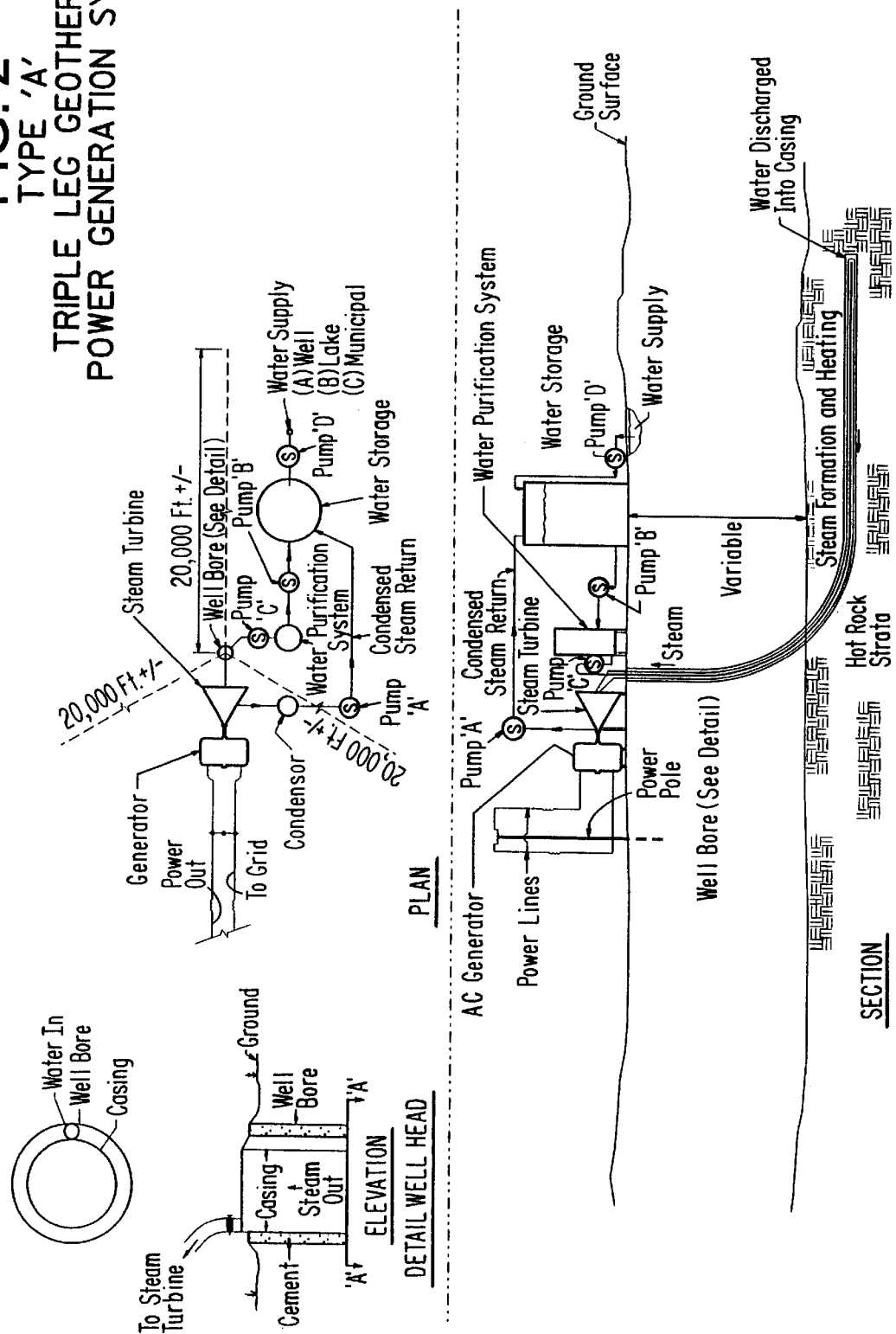

GEOTHERMAL POWER GENERATOR

BACKGROUND

The present invention relates to a geothermal power generation system and more particularly to an improved geothermal power generation system in which the water in the hot rock strata is not used and water from an outside source is used and can be recycled. Geothermal power generation systems have been used for years. The usual system comprises drilling a well into a hot rock strata containing hot water. If the strata is dry and hot, then water may be pumped into the well and into the hot rock strata. The hot rock strata either contains hot water or will heat the water that is pumped in until it reaches a temperature and pressure that exceeds the conditions necessary for the formation of steam. The hot water flows or is pumped out of the well and when the pressure is released the hot water and steam are separated and the steam is used to operate a turbine that turns an electrical generator or some other mechanism. The generator may be connected to a power grid for transport of the electricity to the point of use or the power may be used on site. The ground water may require treatment before it is returned to the hot rock strata. It has been found that in current geothermal power generation systems the natural water or the water that is pumped into the hot rock strata is highly contaminated. The water is generally high in solids and may contain scaling or corrosive chemicals, or both and requires treatment before it can be returned to the hot rock strata. After the steam is used to turn a turbine and the steam condensed to its water phase, the resulting water is contaminated and requires treatment before passage through the piping and processing basins and before it can be returned to the hot rock strata.

It has also been noted that the use of a single well into which water is pumped into and the steam is pumped out of, limits the location of the generator turbine as well as the wells themselves since they must be located close to each other if a single well is used to both receive water, pump out steam and return water to the strata. In addition, the use of a single well limits the amount of time that the water is within the hot rock strata thereby lowering the efficiency of the system.

OBJECTS

The present invention overcomes these difficulties and has for one of its objects the provision of an improved geothermal power generation system in which the water obtaining heat from the hot rock strata does not become contaminated so that it can be recycled, does not require chemical treatment beyond that used in standard boiler water treatment, and is economical in the amount of water used. Another object of the present invention is the provision of an improved geothermal power generation system in which the turbine turning a generator or other mechanism that is to be powered by the steam needed not be located near the input well that is used to receive water into the ground and can be at a location remote from that well. Another object of the present invention is the provision of an improved geothermal power generation system in which the system is more efficient. Another object of the present invention is the provision of an improved geothermal power generation system in which the system is easy to install because the wells can be drilled by horizontal well drilling techniques in common use in the oil industry. The improved geothermal power generation system is simple to use. Another object of the present invention is that the system is maintained without withdrawing water from the strata so that the pressure in the strata is maintained. Other and further objects will be obvious upon the understanding of the illustrative embodiment about to be described, or which will be indicated in the appended claims, and various advantages not referred to herein, will occur to one skilled in the art upon employment of the invention in practice.

DRAWINGS

A preferred embodiment of the invention has been chosen for the purposes of illustration and description and is shown in the accompanying drawings forming a part of the specification wherein:

FIG. 1 is a diagrammatic view of the geothermal power generation system using a separate inlet and outlet well made in accordance with the present invention.

FIG. 2 is a diagrammatic view of the geothermal power system combining the inlet and outlet in a single well.

DESCRIPTION

Referring to the drawing, FIG. 1, the geothermal power generation system of the present invention comprises an input well 1 which is sunk into the ground 2 through the surface 3 until it strikes the hot rock layer or strata 4 in the ground 2. At a location remote from the input well 1, an output well 5 is also formed which penetrates the surface 3 and also extends into the hot rock strata 4. As the well approaches the hot rock strata, the well is turned from vertical to horizontal 6 and is drilled through the hot rock strata 4 and when adequate distance for heating the water is reached, the well bore is turned to the vertical and drilled until it reaches the surface. Therefore, the input well 1, the horizontal well bore 6 and the output well 5 form a continuous path from the surface, down to the hot rock strata, up through the overlying material and reaching the surface through well 5. In the drawing, the well bore 6 is shown as being horizontal. However, it will be understood that the well bore 6 may have a different orientation if desired. As shown in the drawing, more than one horizontal well can be drilled from a single vertical well. A generator turbine assembly 10 or some other mechanism that is to be operated by steam, is located near the output well 5 and is connected to the output well 5 so that steam leaving the output well 5 will operate the generator turbine assembly 10 or similar mechanism to produce power or perform some other function.

With this system clean water is pumped into the input well 1 and released at point 12, moves through the well bore 6 in the hot rock strata 4 where it is turned to steam and is removed from the ground through the output well 5 to operate a generator turbine assembly 10 or some other mechanism. As the steam condenses, in condenser 13, and returns to its water phase, the water should then be stored in tank , 14, purified in plant 15, and pumped back into the input well 1 in order to repeat the operation. However, should the water/steam become contaminated, it cannot be recycled and since it may adversely affect the operation of the generator turbine assembly. Hence the water will pass through a water purification process 15 once each cycle that will maintain its purity.

In order to prevent contamination of the steam/water as it passes through the well bore 6 in the hot rock strata 4, the well bore 6 is lined and/or made of material that resists corrosion 7 so that the water/steam does not come into contact with the hot rock strata 4. The wells 1 and 5 and the well bore 6 may be cemented in place in accordance with standard oil and water well practice. Hence the water/steam remains clean and can be recycled after it operates the generator turbine assembly and no water is wasted. In order to further prevent the water/steam from becoming contaminated it is desirable to have the input well 1 and the output well 5 also lined with non-corrosive casing 8 and 9, respectively, and the casing cemented in place, so that when the water enters the input well 1 it does not come into contact with the ground rock 2 and is not contaminated and when the steam exits from the output well 5, it will not become contaminated since it will not come into contact with the ground rock 2. The water/steam remains clean and can be recycled without danger of contamination. Hence, the system of the present invention saves water since the water need not be discarded and saves the expensive treatment required if contaminated ground water is circulated through the system. It will also be noted that the present invention permits the output well 5 to be located at a place remote from the input well 1. The outlet well 5 can be built close to the generator turbine assembly 10. If for some reason it is not feasible for the input well 1 to be located near the generator turbine assembly 10 it can be dug at a location remote from the input well 1 since the well bore 6 may be of any desired length provided that it mostly is located in the hot rock strata, and as a minimum, needs to be long enough to heat the water to steam, without adversely affecting efficiency and operation of the system of the present invention.

It will thus be seen that the present invention provides an improved geothermal power generation system in which the water entering the hot rock strata is not contaminated so that it can be recycled, in which the generator turbine or other mechanism that is powered by the steam need not be located near the input well that is used to receive water into the ground and can be at a location remote from that well, which will not waste water, which is more efficient and which is easy to install and simple to use.

A variation of the system described above is shown Figure. All of the elements of the System shown in FIG. 1 are present. The same results are accomplished with a single vertical well and one or more horizontal wells. The water is returned to the horizontal reach of the well with a tubing that extends down the casing and discharges at the end of the casing. The water is converted to steam as it flows back out the single well and hence to the turbine.

In either embodiment, the treated water may be at either end of the hot water leg or distributed along all or part of the hot water leg.

In the drawing, it will be understood that there be one or more hot legs. The hot legs may all operate at the same time or they may be used in sequence with one hot leg in operation while the other legs are heating up until the other legs are ready and are sequentially put into service.

In the drawings, the hot leg is shown as being level, but it may slope up or down. The slope may be changed in order to improve the position in the hot rock strata.

The hot leg may require cleaning at infrequent intervals. If required, the water inlet pipe is removed and a cleaning mechanism is run into or through the line. This loosens the objectionable material, which is usually scale. The debris can then be pushed out of the pipe and the water inlet pipe returned in place after the cleaning is complete.

As many varied modifications of the subject matter of this invention will become apparent to those skilled in the art from the detailed description given hereinabove, it will be understood that the present invention is limited only as provided in the claims appended hereto.

The embodiment of the invention in which an exclusive property or privilege is claimed are defined as follows:

1. A geothermal power generation system comprising a substantially vertical input well bore, said input well bore extending from the surface into the ground, a substantially vertical output well bore, the output well bore extending from the surface into the ground, a substantially horizontal well bore connecting the two well bores together, at least a portion of said horizontal well bore being located in a hot rock strata, all of said vertical and horizontal bores being lined with a casing in order to prevent a fluid flowing through the wells bores from coming into contact with the ground or ground water.

2. A system as set forth in claim 1, as set forth in claim 1, wherein said input well bore and said output well bore are spaced from each other.

3. A system as set forth in claim 2 wherein a single vertical well bore and one or more horizontal wells well bores within the hot rock strata function the same as the two bore system.

4. A system as set forth in claim 2, wherein the said horizontal well bore is wholly within the hot rock strata.

5. A system as set forth in claim 4, wherein said input and output well bores extend into the hot rock strata.

6. A system as set forth in claim 5, wherein the input well bore is adapted to receive water and the output well bore is adapted to have steam removed therefrom, and means for passing said water from said input well bore through the horizontal well bore in order to turn the water into steam.

7. A system as set forth in claim 6, wherein steam or water from the condensed steam from the output well bore is returned to the input well bore in order to be recycled.

* * * * *